M. EASTERBROOK, Jr.

Harvester.

No. 2,348.

Reissued Sept. 4, 1866.

INVENTOR

M. Easterbrook Jr

By his Atty

Wm L Langhorne

WITNESSES

Edwin S. Coye

L M Neiston

N. PETERS, Photo-Lithographer, Washington, D. C.

UNITED STATES PATENT OFFICE.

M. EASTERBROOK, JR., OF GENEVA, NEW YORK.

IMPROVEMENT IN HARVESTERS.

Specification forming part of Letters Patent No. 54,876, dated May 22, 1866; Reissue No. 2,348, dated September 4, 1866.

*To all whom it may concern:*

Be it known that I, M. EASTERBROOK, Jr., of Geneva, in the county of Ontario and State of New York, have invented a new and useful Method of Changing the Speed of the Cutters of Harvesters; and I do hereby declare that the following is a full, clear, and exact description thereof, reference being had to the accompanying drawings, making part of this specification, in which—

Figure 1:
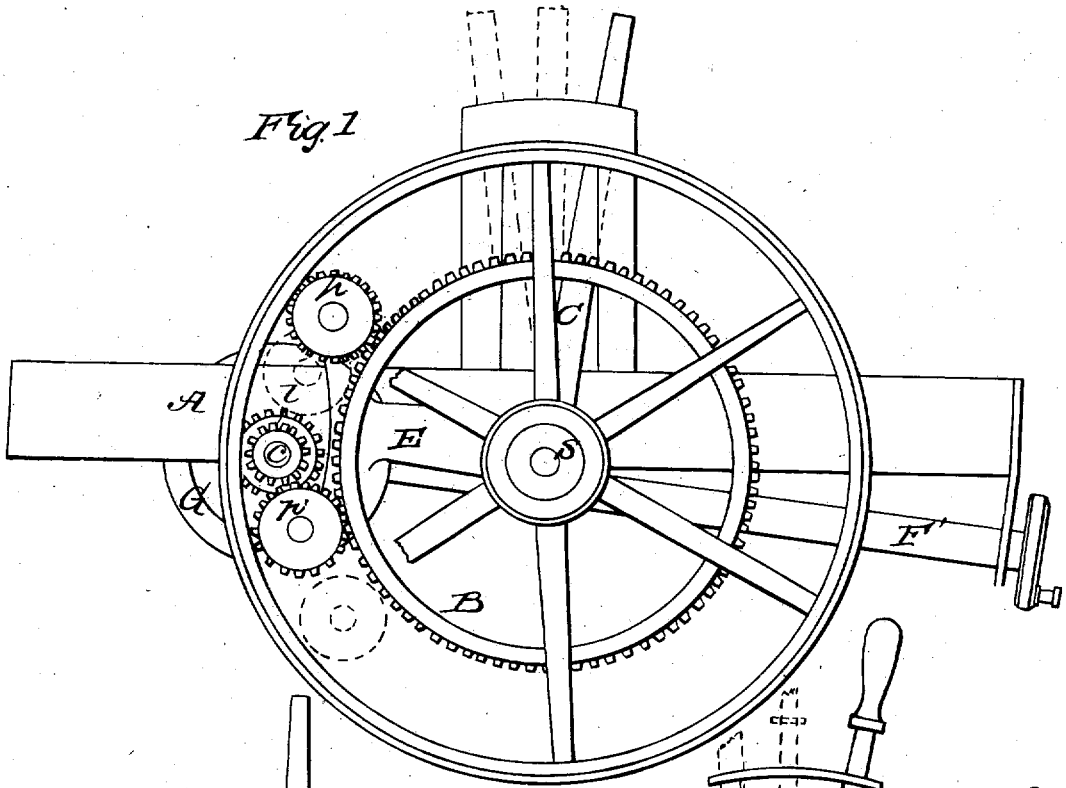
Figure 2:
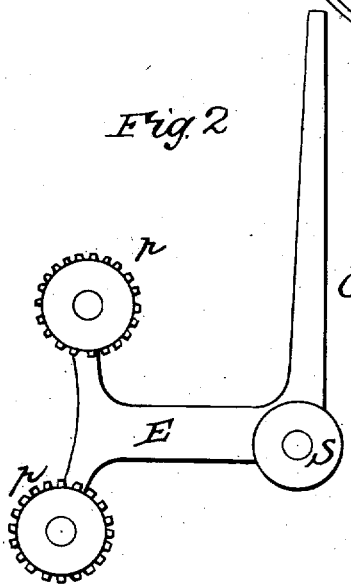
Figure 3:
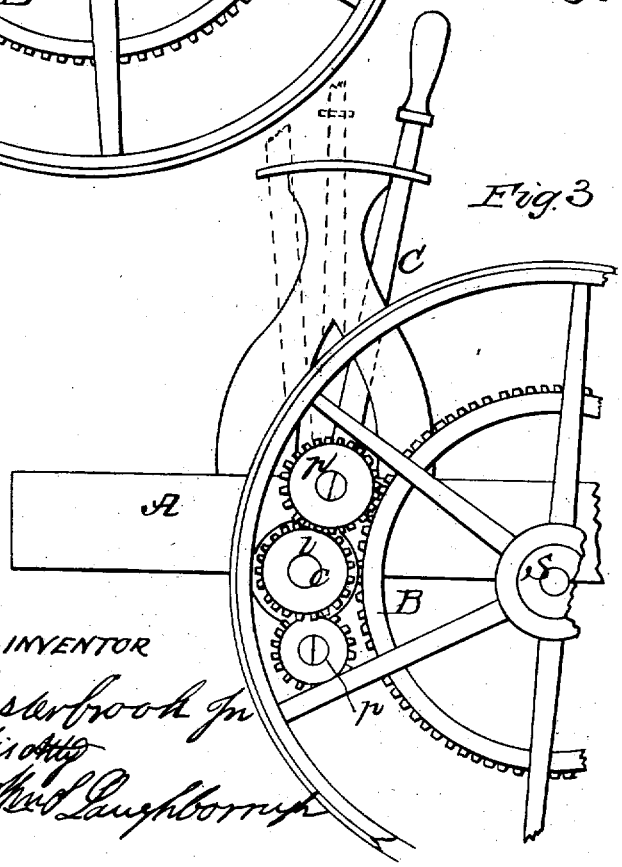

Figure 1 is a side elevation of the driving-wheel and frame of an ordinary harvester having my invention attached. Fig. 2 is a detached view of the lever C, with the two intermediate pinions, *p p'*, attached. Fig. 3 is an elevation showing another construction of the hand-lever C and arrangement of it and the pinions.

Like letters indicate like parts in all the figures.

The object of this invention is the same as in that of my former application filed August 29, 1865; and it consists, mainly, in attaching two loose pinions to an adjusting-lever in such relative relation to a double pinion fixed to the counter-shaft and the driving-wheel that the cutters may be thrown into or out of gear or their motion increased or diminished by said lever without reversing the motion of the crank-shaft.

To enable others to make and use my invention, I will describe its construction and operation.

I use the ordinary spur-wheel B, attached to the ground-wheel D, also the same counter-shaft *c* and bevel-gearing G and crank-shaft F. Instead, however, of the spur-pinion of the counter-shaft gearing into the spur-wheel on the ground-wheel, as ordinarily done, it is made double and rigidly attached to the shaft *c*, and the latter is so hung that the pinion just clears the gear on the driving-wheel. One set of teeth in this pinion *v* forms a considerably-larger pinion than the other set, as shown in the drawings.

The lever C is made L-shaped, as shown in Fig. 2, the short arm E terminating in a T, and this latter carries the two intermediate pinions, *p* and *p'*. The lever is hinged to the shaft S of the ground-wheels, and the pinions are so hung as always to remain in gear with the spur-wheel B. Therefore, when the hand-lever C is thrown from one extreme to the other the pinions simply travel around the spur-wheel until one or the other, as may be desired, enters into gear with the double pinion *b*.

It will be seen that with this arrangement the crank-shaft always revolves in the same direction, whether it is running at the high or low speed, and therefore the changes may be effected without incurring the great difficulty of forcing one gear into another, as when they are revolving in opposite directions, which is extremely impracticable.

It might be desirable to hang the two loose pinions *p* and *p'* to a straight lever, one above the other, and near enough together to keep both in gear with its respective portion of the double pinion *b* and hang the lever to the counter-shaft *c*. In this case when the cutters are not in motion all the gearing is at rest except that on the ground-wheel. Besides the changes would probably be more easily effected, there being less material to move, and of course the construction of the parts would be much simpler.

It will be seen that by this arrangement of the swinging or planetary pinions *p* and *p'* they will more readily enter into gear with the spur-gear B on the ground-wheel than they would with the double pinion, because the spur-gear is moving so much slower than the pinions were when in gear with it, and either of them were to be thrown into gear with the double pinion *b*.

What I claim as my invention is, and desire to secure by Letters Patent, is—

1. The combination of the hand-lever C, and two loose pinions, *p* and *p'*, with the double pinion *b*, and the spur-wheel B, arranged and operating substantially as and for the purposes set forth.

2. The two loose pinions *p* and *p'*, whether they are adjusted with a hand-lever or other suitable device, in combination with the double pinion *b* and the spur-wheel, substantially in the manner and for the purposes shown and described.

3. The arrangement of the pinions *p* and *p'* upon a pivoted hand-lever, substantially as shown in Fig. 3, having its axis or center motion upon the counter-shaft, as and for the purposes set forth.

4. The employment of the pinion *b* of the counter-shaft, made independent of the spur-gear B, and connected thereto when desired by one of two intermediate adjustable gear-wheels, arranged and operating substantially as and for the purposes set forth.

M. EASTERBROOK, JR.

Witnesses:
A. A. BOYCE,
WM. S. LOUGHBOROUGH.